United States Patent

[11] 3,583,614

| [72] | Inventor | Joseph E. Foster, Jr.<br>723 Lincoln Highway, Exton, Pa. 19341 |
|---|---|---|
| [21] | Appl. No. | 730,073 |
| [22] | Filed | May 17, 1968 |
| [45] | Patented | June 8, 1971 |

[54] CONTINUOUS SUCTION CONVEYOR STACKER
5 Claims, 9 Drawing Figs.

[52] U.S. Cl. ..................................................... 225/97,
93/36, 214/6, 271/74
[51] Int. Cl. ..................................................... B26f 3/00,
B65h 31/10, B65h 43/08
[50] Field of Search............................................ 225/97;
271/74; 93/36 A; 214/6 A

[56] References Cited
UNITED STATES PATENTS
| 1,983,708 | 12/1934 | Ruble et al.................... | 93/36 |
| 2,894,147 | 7/1959 | Stidwell....................... | 214/6UX |
| 3,024,921 | 3/1962 | Gaubert ....................... | 271/74X |
| 3,219,203 | 11/1965 | Jeremiah...................... | 214/6 |
| 3,270,929 | 9/1966 | Foster, Jr..................... | 225/97 |
| 3,305,233 | 2/1967 | Cody............................ | 271/74 |

*Primary Examiner*—James M. Meister
*Attorney*—Karl L. Spivak

ABSTRACT: A stripping and stacking machine including a continuous suction conveyor comprising a rotary impactor capable of stripping and feeding previously die-cut cardboard blanks to a segmented, perforated suction conveyor. The suction conveyor operates continuously to carry the previously die-cut and stripped cardboard blanks to a predetermined location whereat a vertically reciprocal grid system activated by an automatic signal operates to separate the said blanks from the conveyor and deposits the blanks upon a descending pallet elevator system.

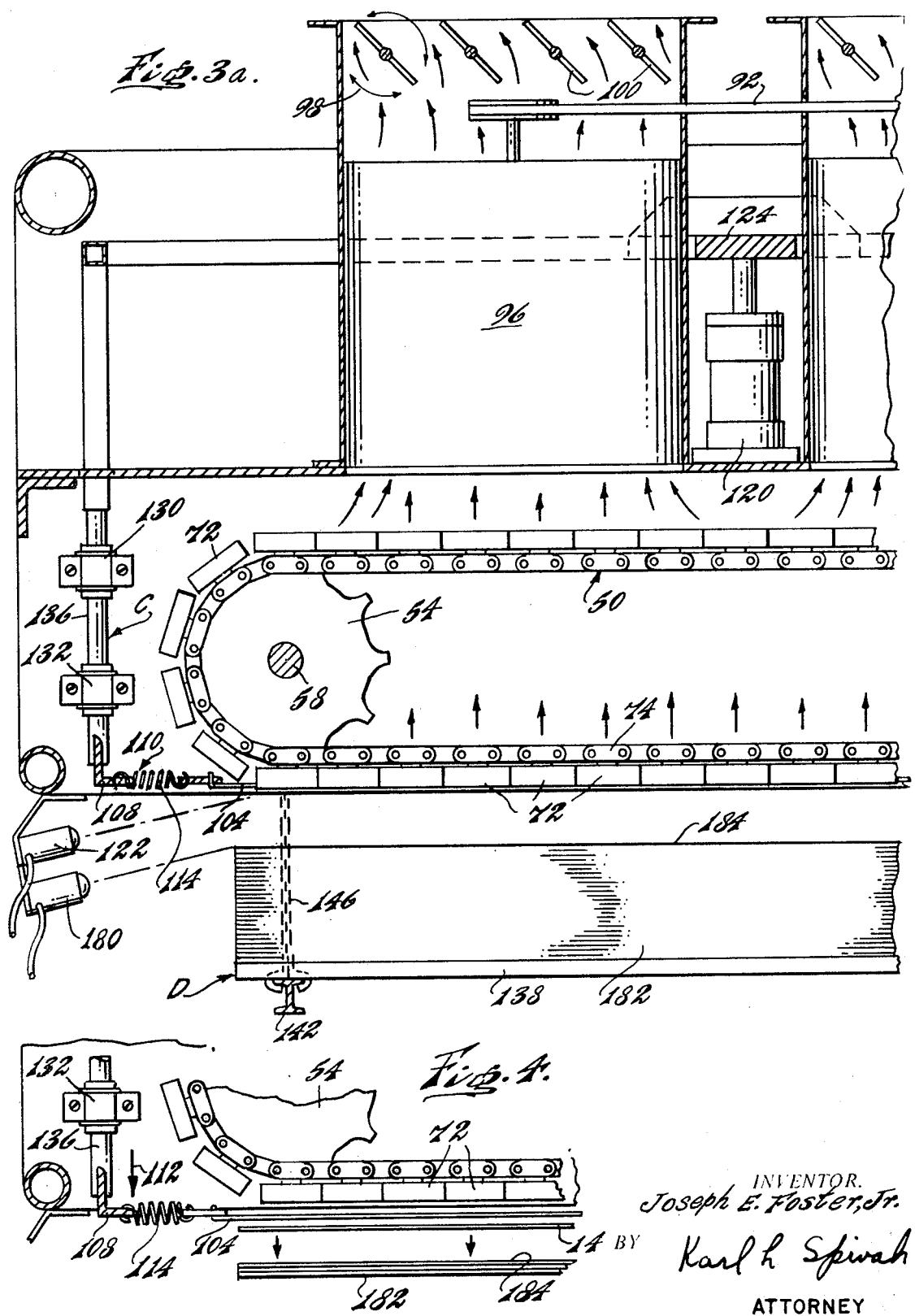

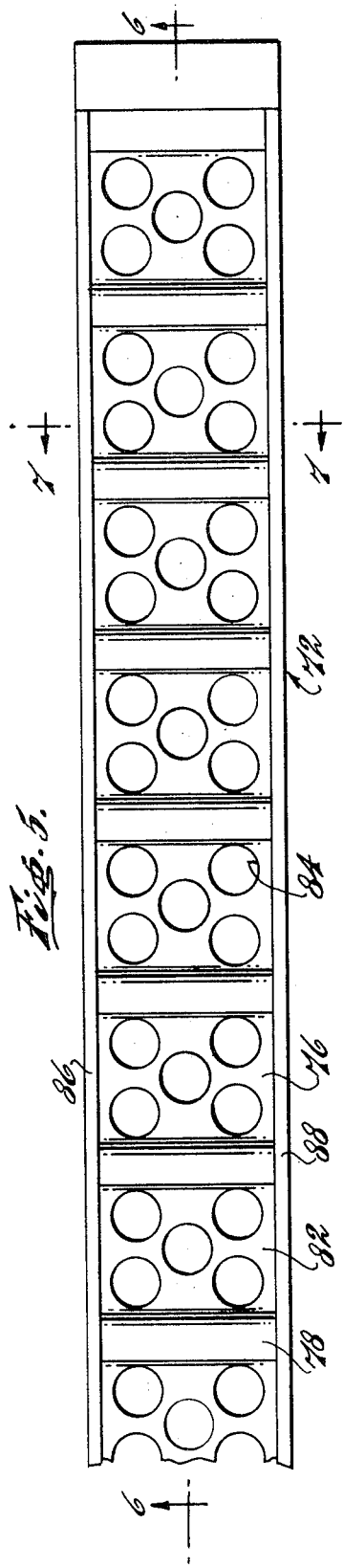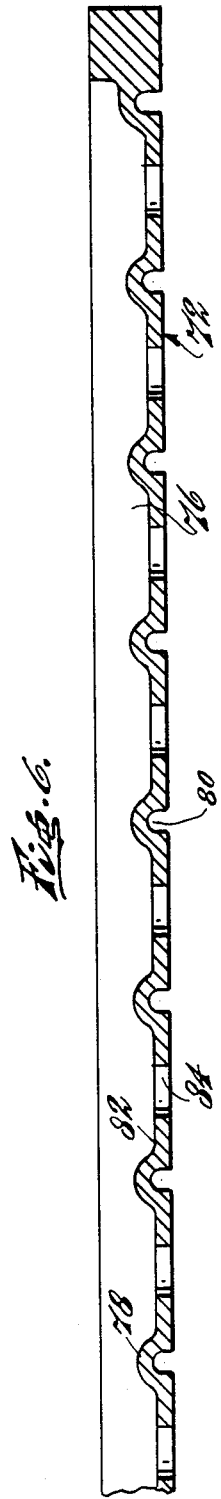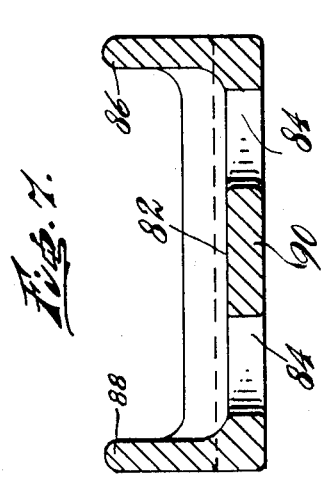

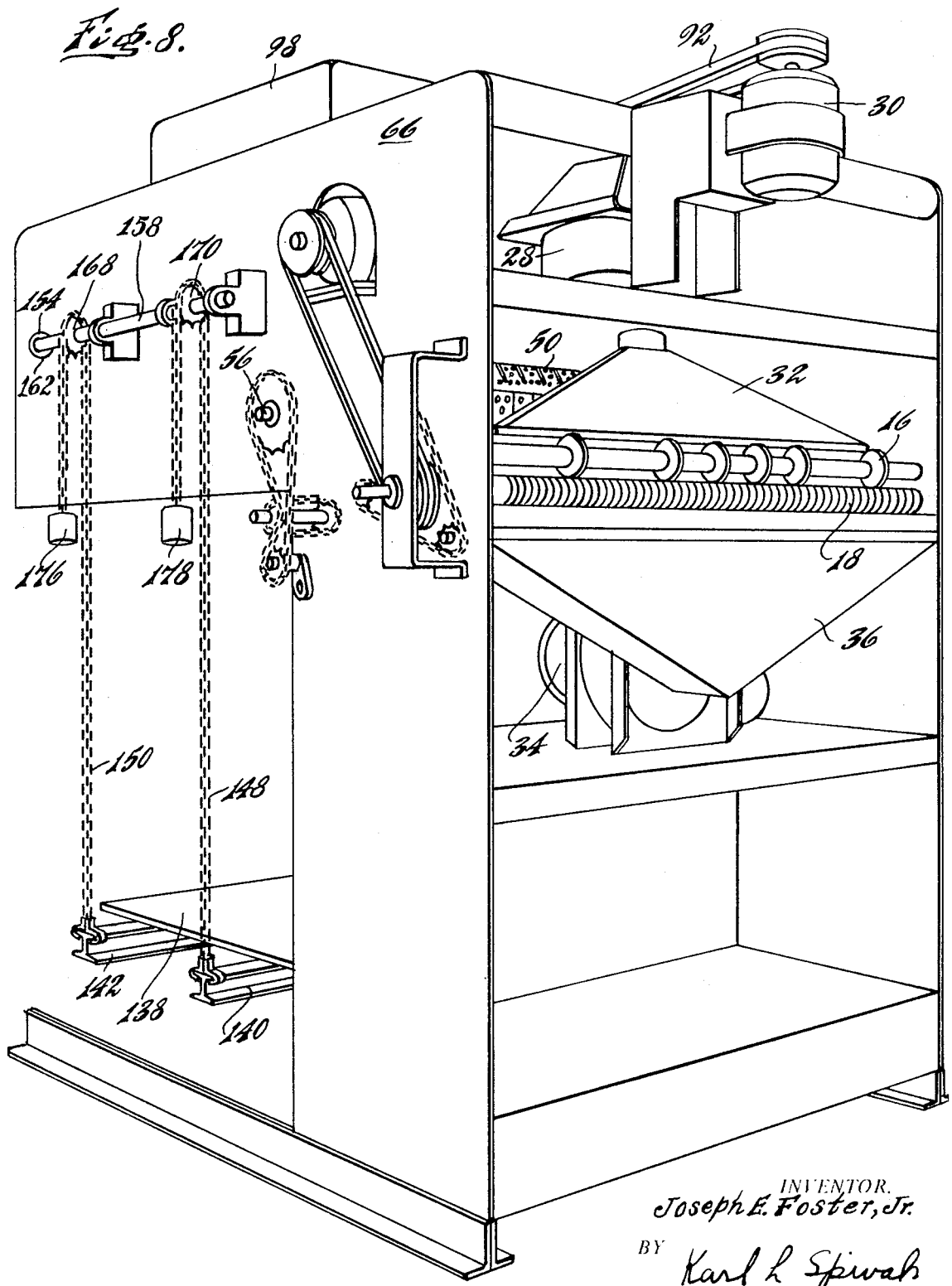

CONTINUOUS SUCTION CONVEYOR STACKER

This invention relates in general to the paper-converting industry and more particularly is directed to a conveyor-type machine finding utility in stripping and stacking previously die-cut cardboard stock.

The present invention is designed for use in the paper-converting industry in the cutting and creasing operation. It is present practice to employ automatic cutting and creasing machines to cut and crease paper stock from 0.0001 to 0.00001 of an inch in thickness. These machines deliver the paper stock automatically in skid loads approximately 4 to 5 feet in height with the die-cut waste portions still attached. It is the usual practice to employ manually operated air hammers to strip the waste outer edges of the die-cut products. This method is also employed whenever possible to strip the internal waste material of the die-cut products. However, in many instances, the internal waste portions cannot be economically removed by present-day methods and so the paper stock is shipped with the waste material included, for later removal by the end user.

There is also automatic equipment in use for stripping previously die-cut and creased cardboard blanks, but such equipment must be set up and timed to match each particular product that is fed from the die-cutting machine. The instant machine improves over the prior art in that it is the only machine available that will strip all internal and external waste from die-cut blanks without setup, that can carry the finished product uniformly after it is free of waste and then stack the said blanks onto pallets continuously to obtain piles of any predetermined, desired height.

The machine is capable of handling 4,000 previously die-cut and stripped sheets per hour without requiring setup. The machine is unique in that is is not necessary to orient or time the die-cut sheets to the machine in order to remove the waste portions of the sheet and to stack them on a skid in an even pile in the order in which they were cut. Applicant is aware of no other prior-art devices designed for and capable of automatically and continuously stripping the waste from die-cut cardboard stock.

Prior-art cardboard stock handling machines have utilized suction conveyors to transport the sheets from one location to another. Such devices generally function as designed and are suitable for the use intended. However, in order to separate the sheet being transported from the suction conveyor, prior-art machines have incorporated mechanisms either to intermittently stop the conveyor or the suction fans in order to deposit the transported sheets at the desired terminal location. The intermittent starting and stopping of the equipment necessarily limits the speed of the operation and in addition, causes increased maintenance expenditures due to mechanical wear of the moving parts. In addition, prior-art cardboard stock handling machinery required manual adjustment and considerable setup time to compensate for cardboard stock of different sizes. The additional setup time and worker's time required in order to accommodate sheets of different sizes has resulted in greatly increased handling costs during normal operating periods.

The instant device seeks to overcome the shortcomings of prior-art machines by providing a means and method of transporting paper stock from one location to another across the machine in a continuous manner without interruption or stoppages in the operating cycle. In addition, means have been provided to automatically separate the cardboard stock from the suction conveyor while the conveyor continuously moves and to deposit the die-cut and stripped sheets upon an elevating pallet capable of continuously descending in response to automatic signals monitoring the height of the pile of blanks deposited thereon.

A unique cardboard blank separating grid system comprising a plurality of wires passing through the suction conveyor and capable of reciprocal motion therethrough at right angles to the plane of operation of the conveyor functions to disassociate the cardboard blanks from the conveyor at a predetermined location without interruption to or interference with the continuous operation of the suction conveyor or the suction fans.

It is therefore an object of the instant invention to provide an improved, continuous cardboard blank stripping machine of the type set forth.

It is another object of the instant invention to provide a continuous cardboard blank stripping machine capable of stripping and stacking previously die-cut cardboard stock from 10 point to 100 point in thickness.

It is another object of the instant invention to provide a continuous cardboard-stripping machine capable of stripping, transporting and stacking 4,000 previously die-cut cardboard blanks per hour.

It is another object of the instant invention to provide a novel continuous cardboard blank stripping machine capable of transporting and stacking previously die-cut cardboard blanks in a continuous manner without intermittently stopping the suction conveyor.

It is another object of the instant invention to provide a novel continuous cardboard blank stripping machine incorporating a rotary impactor capable of vibrating the cardboard stock to loosen and remove the die-cut waste portions.

It is another object of the instant invention to provide a novel continuous suction conveyor capable of accommodating various-sized cardboard blanks without setup or other downtime as necessary to orient or time the product to the machine.

It is another object of the instant invention to provide a novel, continuous suction conveyor capable of accommodating various-size cardboard blanks without setup or other downtime as necessary to orient or time the product to the machine.

It is another object of the instant invention to provide a continuous suction conveyor incorporating a reciprocating grid system functioning at right angles to the direction of travel of the conveyor.

It is another object of the instant invention to provide a novel, continuous suction conveyor incorporating a grid system comprising a series of wires passing through portions of the suction conveyor and having reciprocating motion with respect thereto.

It is another object of the instant invention to provide a novel, continuous suction conveyor including a pallet elevator system to receive the previously die-cut and stripped cardboard blanks.

It is another object of the instant invention to provide a novel, continuous feed conveyor including a pallet elevator system responsive to signals to automatically lower the pile so that succeeding sheets of cardboard stock can continuously be placed on top to form a pile of predetermined height for easy handling.

It is another object of the instant invention to provide a novel, continuous suction conveyor including in one machine the operations of vibrating cardboard blanks, removing waste portions from previous die-cut operations, transporting the said die-cut and stripped sheets upon a continuous suction conveyor and depositing said sheets upon a descending pallet elevator system.

It is another object of the instant invention to provide a novel stripping and stacking machine capable of handling finished products uniformly without nicking them together.

It is another object of the instant invention to provide an automatic stripping and stacking machine designed to completely eliminate manual air hammer stripping entirely.

It is another object of the instant invention to provide a novel, continuous suction conveyor that is rugged in construction, simple in design and trouble free when in operation.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 3A is a partial cross-sectional view taken along line 3-3 of FIG. 1, showing generally the rear half of the machine and continuing the view of FIG. 3.

FIG. 4 is a partial, cross-sectional view similar to FIG. 3A showing the grid system in lower position.

FIG. 5 is a top plan view of a perforated suction box.

FIG. 6 is a cross-sectional view taken along line 6-6 of FIG. 4, looking in the direction of the arrows.

FIG. 7 is a cross-sectional view taken along line 7-7 of FIG. 5, looking in the direction of the arrows.

FIG. 8 is a left front perspective view of the device.

Figure 1:
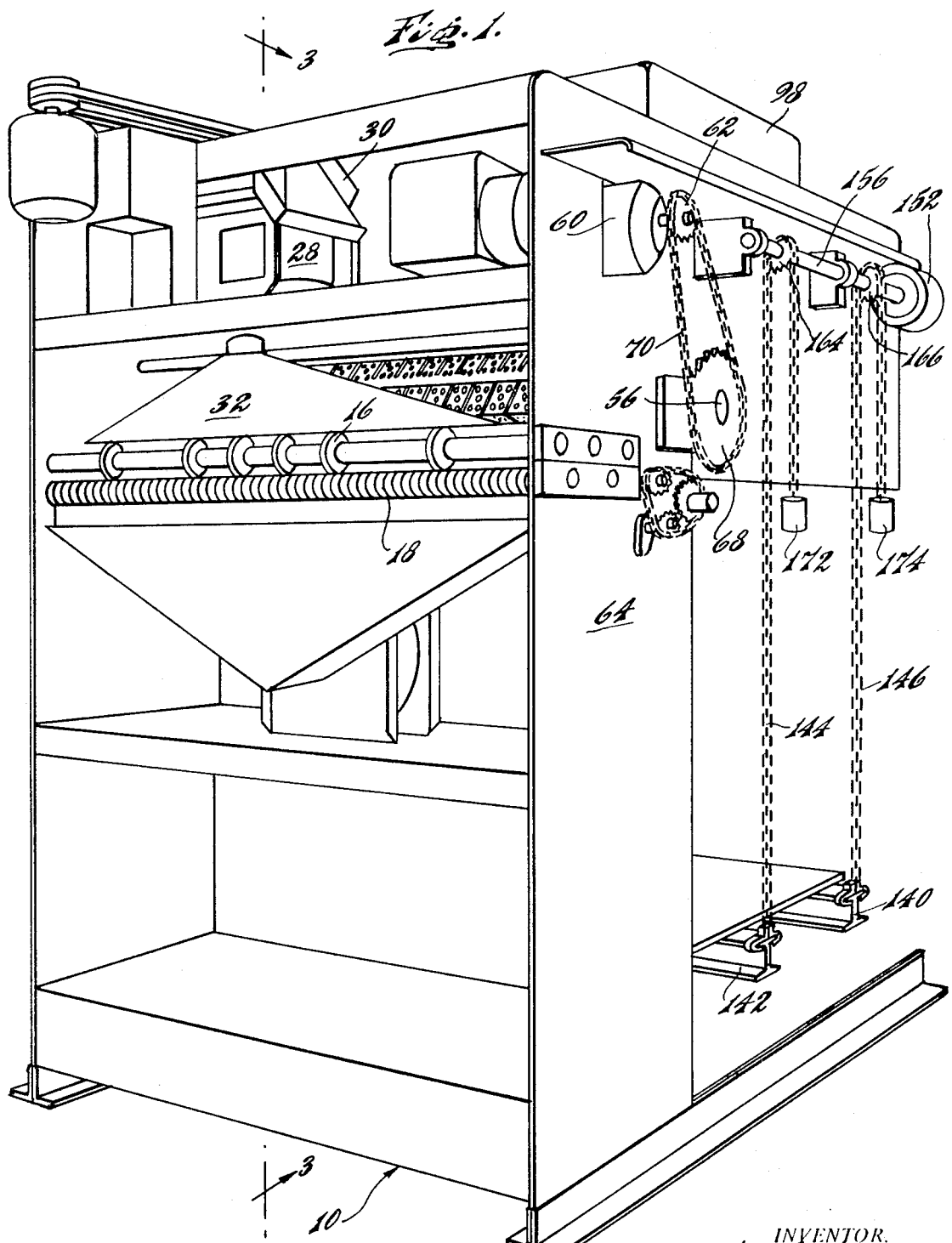
FIG. 1 is a right, front perspective view of the device showing the stripping mechanism and suction and pressure chambers.
Figure 2:
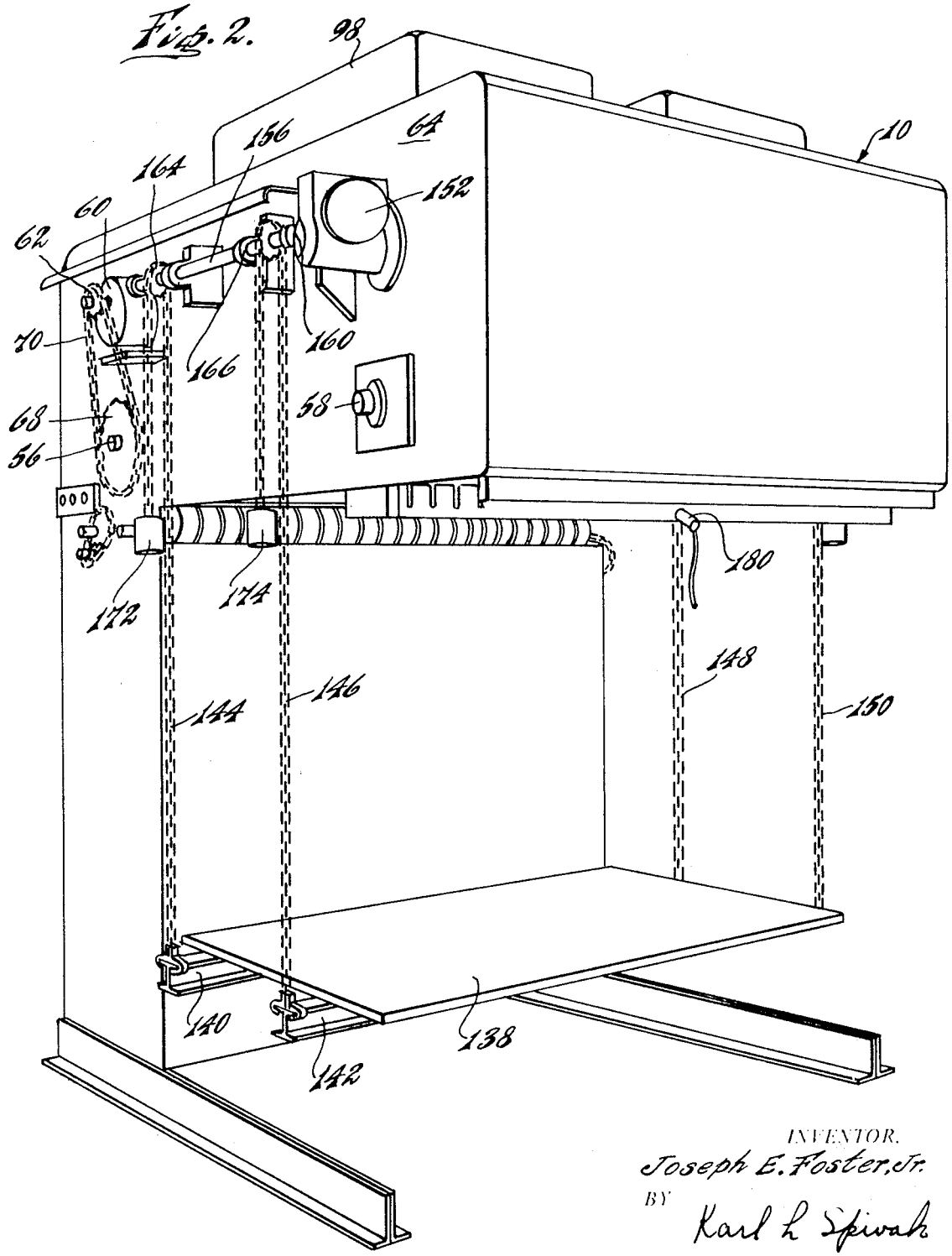
FIG. 2 is a rear perspective view of the machine showing descending pallet elevator system.

Although specific terms are used in the following description for the sake of clarity, these terms are intended to refer only to the particular structure of my invention selected for illustration in the drawings and are not intended to define or limit the scope of the invention.

Referring now to the drawings, it will be seen that the device consists essentially of a vibrating and stripping section generally designated A wherein previously die-cut cardboard blanks 14 are fed by the cutter and creaser (not shown) toward the impactor 12 for vibrating the waste portions free from the blank as will hereinafter be more fully set forth. The stripped blank 14 then travels across the machine 10 upon the underside of the suction conveyor system generally designated B. The suction conveyor system B integrally incorporates the vertically reciprocating grid system C which functions to precisely separate the previously stripped blanks from the suction conveyor system B and to deposit the blanks upon an elevating skid carried by a descending elevator system herein generally designated D.

A pair of cooperating upper and lower feed rollers 16, 18, feed individual cardboard blanks 14 over the finger section 22, to receive multiple strokes imposed by the operation of the impactor 12. The corners of the rectangular impactor 12 protrude through the finger section 22 and impart multiple impacts upon the underside of the cardboard blanks 14 in the manner previously fully illustrated and disclosed in U.S. Pat. No. 3,270,929. Preferably, the impactor 12 rotates at 3,000 r.p.m. for optimum results. As illustrated, the impactor is constructed of square cross-sectional configuration and thereby provides four striking surfaces each revolution. It is therefore seen that the impactor is capable of striking the cardboard blanks 14 at a rate of 12,000 times per minute. In accordance with the teachings of U.S. Pat. No. 3,270,929, it can be appreciated that the leading edge of the blank 14 vibrates freely upon contact with the impactor 12 after it feeds through the intake rollers 16, 18. Similarly, the trailing edge of the blank 14 vibrates freely due to the contacts of the impactor 12 when the forward edge of the blank 14 feeds into the nip of the upper and lower discharge rollers 24, 26. The combination of the vibrating action of the sheet itself and the force of the multiple rotary blows of the impactor cooperate to shake the die-cut scrape sections 38 free from the useable portions of the blank sheet 14.

An upper blower 28 powered by an electrical motor 30 pressurizes the chamber 32 which is sized to substantially overlie the finger section 22. In this manner, air from the blower 28 impinges upon the upper surface of the blank 14 to force the lower surface of the blank 14 into position to continuously receive impacts from the rotary impactor 12. The pressure of the air from the blower 28 further serves to assure maximum contact between the impactor and the blank 14 as the blank 14 feeds through the vibrating and stripping section A. The lower blower 34 receives its suction through the waste removal chamber 36 and serves as a vacuum-cleaning operation in cooperation with the impactor 12. The waste particles 38, which are vibrated free by the operation of the impactor 12 and the vibrating action of the leading and trailing edges of blanks 14 as they pass between the rollers 16, 18, and 24, 26, are pulled by the vacuum of the lower blower 34 through the waste removal chamber 36 for ultimate disposal at the fan discharge 40. A motor 42 powers the blower 34 through a conventional drive 44 in well-known manner.

Following removal of the waste particles 38, the blank 14 travels rearwardly out of the vibrating and stripping section A under impetus of the upper and lower discharge rollers 24, 26 through the cooperating roller 46 and segmented skate roller 48 which serve to drive the stripped blanks onto the suction conveyor system B.

Figure 3:
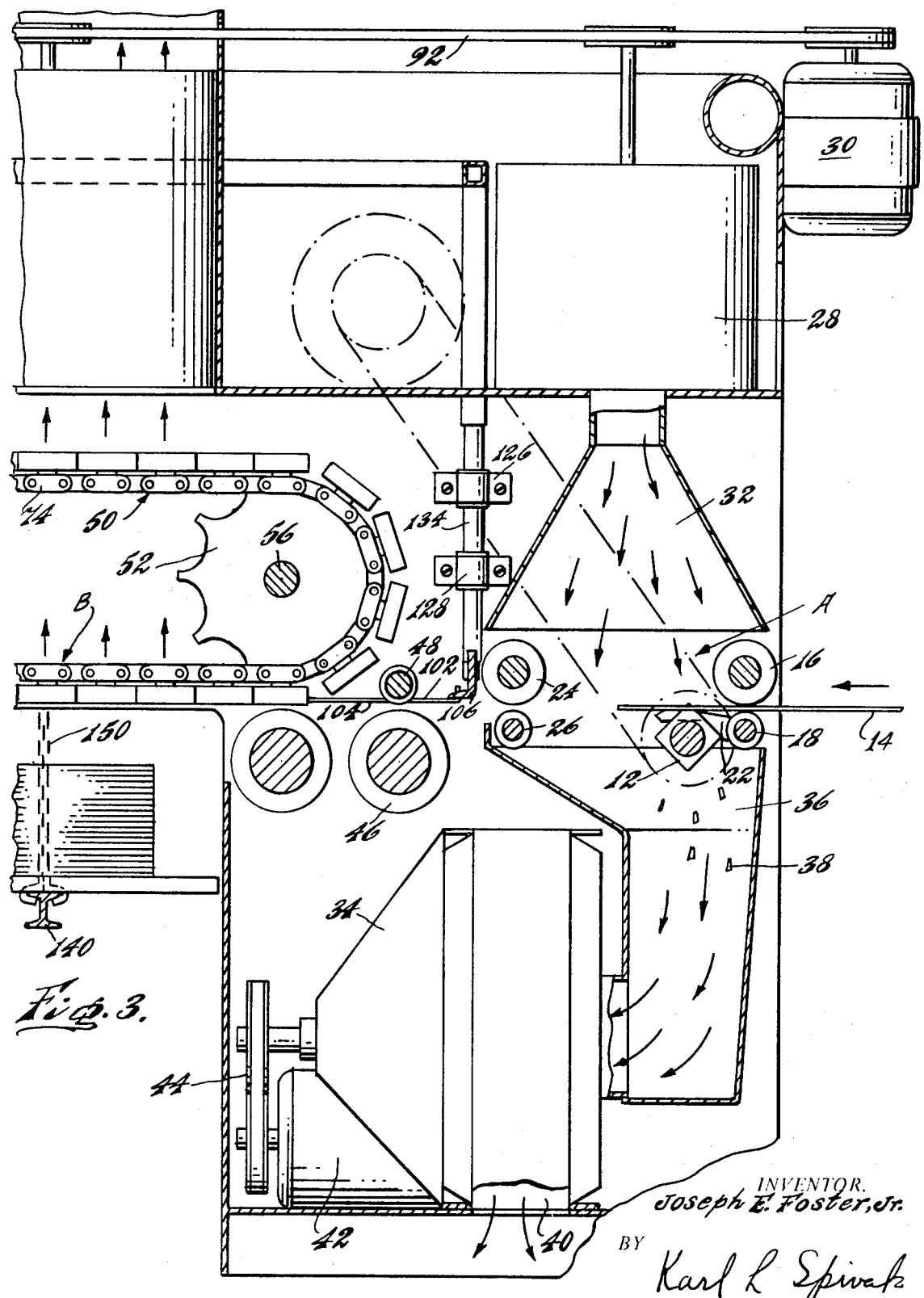
FIG. 3 is a partial cross-sectional view taken along line 3-3 of FIG. 1 and showing generally the front half of the machine.

As best seen in FIGS. 3 and 4, the suction conveyor 50 forms an endless loop which turns about the leading and trailing suction rolls 52, 54. The rolls 52, 54 are rotatively carried respectively on the shafts 56, 58 which are journaled through the right and left machine supports 64, 66. The driving motor 60 functions to rotate the suction conveyor 50 about the rolls 52, 54 through a chain drive 70. The chain drive 70 operatively connects to a direct-connected driving gear 62 and to a driven gear 68 which may be pinned or otherwise affixed to the end of the leading suction roll shaft 56 in the usual manner.

Referring now to FIGS. 5, 6 and 7, the suction conveyor 50 comprises an endless chain rotating about the leading and trailing suction rolls 52, 54 and includes a plurality of horizontally juxtaposed elongated, perforated, transverse, suction boxes 72 which are operatively affixed to the supporting links 74 as required for longitudinal and rotative motion with respect to the stripping machine 10. Each suction box 72 comprises a plurality of transverse segments 76 joined together through the longitudinal, arched junctions 78 which rise above the floor of each segment to provide a plurality of spaced, longitudinal, grid-receiving slots 80. The floor 82 of each segment 76 is drilled or otherwise provided with a plurality of openings 84 which serve as air passages for suction pickup of the blanks 14 as hereinafter will be more fully set forth. Each suction box 72 is substantially channel shaped in cross section having the perforations 84 drilled through the web section 90 and the right and left flanges 86, 88 facing inwardly to strengthen each suction box 72. As illustrated, the floor of each segment 76 is preferably provided with five suction holes 84 of eleven-sixteenths inches diameter each and arranged in a general cross pattern for optimum operating efficiency.

Vanaxeal fans 96 overly the medial portion of the suction conveyor 50 and are powered through a belt drive 92 by the electrical motor 30 in well-known manner. The fans 96 draw their suction directly through the multiple holes 84 provided in the suction boxes 72 and thus create sufficient suction pressure to attract and carry the cardboard blanks 14. The fans discharge directly upwardly through a discharge plenum 98 through the operatively affixed suction control louvers 100. The louvers 100 may be manually operated as a conventional volume damper in the usual manner to precisely control the suction pressure imposed at the suction openings 84. In this manner, the suction pressure available at the conveyor 50 may be readily adjusted as required to pick up and carry previously die-cut and stripped cardboard blanks 14 across the conveyor for deposit upon the deelevating pallet system D as hereinbefore more fully discussed.

Referring now to FIG. 3, 3a, a reciprocating grid system C comprising a plurality of spaced, horizontally disposed, longitudinal separating wires 104 may be observed. Each wire 104 longitudinally stretches between the front and rear grid bars 106, 108, which are reciprocal between an upper position 110 and a lower position 112 in response to automatic sensing devices as will hereinafter be more fully explained. Each grid wire 104 respectively lies within the aligned suction box slots 80 and permits longitudinal motion of the suction boxes with respect therewith as the conveyor 50 rotates about the rolls 52, 54. Individual turnbuckles 114 function to permit individual tension adjustment of the respective grid wires 104.

The front and rear grid brackets 106, 108, vertically reciprocate a distance of approximately 6 inches in response to operation of the air cylinder 120. The vertical reciprocal distance must be sufficient to positively separate the cardboard blanks 14 from the suction attraction of the blowers 96. A sensing device 122, which may be an electric eye, a microlimit switch or suitable combination of the two, precisely senses the leading edge of the blank 14 when the blank is transported to a position over the deelevating pallet system D to activate the air cylinder 120. The air cylinder 120 functions through the crosshead 124 and quickly lowers the entire grid system C approximately 2 inches, thereby forcing the blank 14 downwardly away from the bottom of the suction boxes 72 to release the blanks from the attraction of the suction forces impressed at the perforations 84 by the blowers 96. The right and left sleeve bearings 126, 128, 130, 132 journal the vertical grid shafts 134, 136 and facilitate rapid, aligned, reciprocal movement of the grid system C.

The deelevating pallet system D receives the cardboard blanks 14 transported by the conveyor system B and released therefrom by the separating action of the grid system C. A horizontal platform 138 provides the base of the deelevating pallet system D and functions to removably receive pallets (not shown) in well-known manner upon which the previously die-cut, stripped and transported cardboard blanks are automatically piled as hereinbefore set forth. The individual pallets may be removed from the platform 138 when loaded using conventional forklift trucks in the usual manner. The platform 138 securely rests upon the transverse supports 140, 142 which in turn are end carried by the elevating chains 144, 146, 148, 150. Right and left clutch brakes 152, 154 turn the respective elevating shafts 156, 158 through gear drives 160, 162 in the usual manner to rotate the respective chain gears 164, 166 which are affixed respectively upon the shafts 156, 158. The chains 144, 146, 148, 150 rotatively engage the teeth of the gears 164, 166, 168, 170 to thus raise or lower the platform 138 in response to the operation of the clutch brakes 152, 154. The counterweights 172, 174, 176, 178 respectively end connect to the chains 144, 146, 148, 150 and serve to equalize the weight of chains about the gears 164, 166, 168, 170 in the usual manner to compensate for movement of the chains.

A second sensing device 180, which may be an electric eye circuit, determines the height of the pile 182 of cardboard blanks 14 deposited upon the pallet (not shown) and functions to lower the platform 138 by activating the clutch brakes 152, 154 in response to the buildup of the pile 182 by successive deposit of transported blanks. In this manner, the top 184 of the pile may be maintained at a constant vertical distance from the bottom of the suction conveyor 50 at all times. When the pile becomes 4 or 5 feet in height as predetermined by the operator, the entire pallet with the pile 184 of stripped cardboard blanks 14 may be removed from the platform 138 and a new pallet inserted in lieu thereof to receive further deposits of stripped and transported blanks.

Although I have described my intention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

1. In continuous suction conveyor used for stripping waste particles from previously die-cut sheets and then stacking the said stripped sheets, the combination of
   A. vibrator means receiving the said die-cut sheets and stripping waste from same,
      1. said means including finger means supporting the said sheets,
      2. said means including rotary impactor means;
   B. blower means associated with the said vibrator means,
      1. said blower means forcing the said sheets against the finger means and into contact with a portion of the said vibrator means;
   C. suction conveyor means receiving the stripped sheets from the vibrator means,
      1. said suction conveyor means including suction fan means,
      2. said suction conveyor means transporting the said sheets from the vibrator means to pallet means
         a. said suction conveyor means including a plurality of spaced, longitudinal slots; and
   D. grid means associated with the said suction conveyor means,
      1. said grid means having reciprocal motion with respect to the said suction conveyor means,
         a. said grid means being reciprocal between an upper position and a lower position,
      2. said grid means including means to separate the said sheets from the said suction conveyor means,
         a. the said grid means including a plurality of spaced, longitudinal wires,
            (.1) said wires lying within the said longitudinal slots when the grid means reciprocate to the said upper position.

2. In a continuous section conveyor used for stripping waste particles from previously die-cut sheets and then stacking the said stripped sheets, the combination of
   A. vibrator means receiving the said die-cut sheets and stripping waste from same,
      1. said means including finger means supporting the said sheets,
      2. said means including rotary impactor means;
   B. blower means associated with the said vibrator means,
      1. said blower means forcing the said sheets against the finger means and into contact with a portion of the said vibrator means;
   C. suction conveyor means receiving the stripped sheets from the vibrator means,
      1. said suction means including suction fan means,
      2. said suction conveyor means transporting the said sheets from the vibrator means to pallet means,
         a. said suction conveyor means including a plurality of parallel, transverse suction boxes,
            (.1) each said suction box being transversely divided into a plurality of individual suction segments,
               (.a) each said segment having at least one suction opening,
               (.b) each said segment being defined by spaced, longitudinal, grid-receiving slots extending upwardly from the bottom of each suction box; and
   D. grid means associated with the said suction conveyor means,
      1. said grid means having reciprocal motion with respect to the said suction conveyor means,
         a. said grid means being reciprocal between an upper position and a lower position,
      2. said grid means including means to separate the said sheets from the said suction conveyor means.

3. In a continuous suction conveyor used for stripping waste particles from previously die-cut sheets and then stacking the said stripped sheets, the combination of
   A. stripping means receiving the said die-cut sheets and stripping waste portions from them;
   B. suction conveyor means receiving the said stripped sheets from the stripping means,
      1. said suction conveyor means including suction fan means,
      2. said suction conveyor means transporting the said sheets from the stripping means to stacking means,
         a. said suction conveyor means including a plurality of spaced, longitudinal slots; and
   C. grid means associated with the said suction conveyor means, 1. said grid means having vertical reciprocal motion with respect to the said suction conveyor means,
   a. said grid means being reciprocal between an upper position and a lower position,
2. said grid means including a plurality of spaced, longitudinal wires,
   a. said wires lying within the said suction conveyor means spaced slots when the said grid means reciprocate to the upper position,
      (.1) said wires extending below the said suction conveyor means when the grid means reciprocate to the said lower position.

4. In a continuous suction conveyor used for stripping waste particles from previously die-cut sheets and then stacking the said stripped sheets, the combination of
   A. stripping means receiving the said die-cut sheets and stripping waste particles therefrom;
   B. suction conveyor means receiving the stripped sheets from the stripping means,
      1. said suction conveyor means including suction fan means,
         a. said suction fan means drawing air directly through the suction conveyor means,
      2. said suction conveyor means transporting the said sheets from the stripping means to stacking means,
      3. said suction conveyor means including a plurality of parallel, transverse suction boxes,
         a. each said suction box being transversely divided into a plurality of individual suction segments,
            (.1) each said segment having at least one suction opening,
            (.2) the said segments being defined by spaced, longitudinal grid receiving slots extending upwardly from the bottom of the said suction boxes; and
   C. grid means associated with the said suction conveyor means,
      1. said grid means having vertical reciprocal motion with respect to the said suction conveyor means,
         a. said grid means being reciprocal between an upper position and a lower position,
      2. said grid means including means to separate the said sheets from the said suction conveyor means.

5. The invention of claim 4 wherein the said grid means include a plurality of spaced, longitudinal wires, the said wires lying within the said grid receiving slots when the grid means reciprocate to the upper position, and said wires lying in a plane spaced below the said slots when the grid means reciprocate to the said lower position.